(12) United States Patent
Price et al.

(10) Patent No.: US 7,729,853 B2
(45) Date of Patent: Jun. 1, 2010

(54) INTEGRATED GUIDANCE SYSTEM

(75) Inventors: Gregory Robin Price, Christchurch (NZ); Gregory Craig Wallace, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/735,576

(22) Filed: Dec. 12, 2003

(65) Prior Publication Data

US 2005/0131640 A1 Jun. 16, 2005

(51) Int. Cl.
*G01C 22/00* (2006.01)
(52) U.S. Cl. ...................................... 701/209; 340/974
(58) Field of Classification Search .................. 701/209, 701/3, 200, 213, 202, 28, 50, 208, 207, 23, 701/224, 93; 340/974, 988, 461, 525, 684, 340/815.45; 342/47; 180/168, 204
See application file for complete search history.

(56) References Cited

U.S. PATENT DOCUMENTS

| | | | |
|---|---|---|---|
| 5,334,987 A | 8/1994 | Teach | 342/357 |
| 5,369,589 A | 11/1994 | Steiner | 364/449 |
| 5,528,248 A | 6/1996 | Steiner et al. | 342/357 |
| 5,717,593 A * | 2/1998 | Gvili | 701/207 |
| 5,945,917 A * | 8/1999 | Harry | 340/815.45 |
| 6,087,984 A | 7/2000 | Keller | |
| 6,104,979 A * | 8/2000 | Fowler et al. | 701/208 |
| 6,199,000 B1 | 3/2001 | Keller | |
| 6,236,916 B1 * | 5/2001 | Staub et al. | 701/29 |
| 6,539,303 B2 * | 3/2003 | McClure et al. | 701/213 |
| 6,553,311 B2 | 4/2003 | Ahearn et al. | 701/213 |
| 6,567,747 B1 | 5/2003 | Lange et al. | 701/213 |
| 6,571,155 B2 * | 5/2003 | Carriker et al. | 701/3 |
| 6,711,475 B2 * | 3/2004 | Murphy | 701/3 |
| 6,762,741 B2 * | 7/2004 | Weindorf | 345/102 |
| 2002/0083695 A1 | 7/2002 | Behnke et al. | |

* cited by examiner

*Primary Examiner*—Dalena Tran

(57) ABSTRACT

An integrated guidance system is disclosed. The integrated guidance system includes a position determination system adapted for determining a current position. Additionally, the integrated guidance system further includes a lightbar device adapted for providing a visual representation of the deviation of the current position from a desired path to guide movement along the desired path. Furthermore, the integrated guidance system has a data input device, and a display device for displaying text and graphics. Moreover, the integrated guidance system includes a user interface system adapted for facilitating user interaction by integrating operation of the position determination system, the lightbar device, the data input device, and the display device. In an embodiment, the user interface system comprises a processor and processor-executable instructions for implementing a user interface.

25 Claims, 14 Drawing Sheets

INTEGRATED GUIDANCE SYSTEM

BACKGROUND OF THE INVENTION

1. Field of the Invention

Embodiments of the present invention generally relate to guidance systems. More particularly, embodiments of the present invention relate to integrated guidance systems.

2. Related Art

Guidance systems were developed to guide an operator of a mechanical system that is capable of movement, such as, for example, a vehicle, in traveling along a desired path, whereas the guidance system alerts the operator when he deviates from the desired path (which is predefined) and provides the corrective action that the operator needs to perform to continue on the desired path. These guidance systems provide a variety of functions. Typically, the variety of functions is dependent on the number of different types of guidance components possessed by the guidance system. Some guidance systems are designed to be handheld by the operator while driving the vehicle. More importantly, each of these guidance systems generally is a collection of separate guidance components that are coupled together with cables. Moreover, while one guidance system may have two separate guidance components, another guidance system may have less or more of these separate guidance components.

In particular, guidance systems are widely being utilized in agriculture. Guidance systems provide agricultural equipment operators with precise, parallel swath guidance for driving straight rows or following curves during tasks such as, for example, field preparation, seeding, harvesting, product applications to the fields, and field mapping. Hence, improved productivity, improved yield, and improved safety are realized through use of guidance systems.

Unfortunately, guidance systems that are a collection of separate guidance components that are coupled together with cables and handheld guidance systems create several problems. The guidance systems that are a collection of separate guidance components that are coupled together with cables are prone to a variety of cable related problems (e.g., damage by accidental pulling of a cable, misplacement of a cable, incompatibility of cables, etc.) and can interfere with the operator's control of the agricultural equipment, such as, for example, a tractor, since the cab of the tractor is generally small. Moreover, handheld guidance systems distract the operator while driving the tractor since the operator has to look periodically at the handheld guidance system instead of looking in front of the tractor as it moves. Furthermore, these guidance systems provide a data input device that has a large number of buttons or keys that make it difficult for the operator to interact with these guidance systems as he drives the tractor.

SUMMARY OF THE INVENTION

An integrated guidance system is disclosed. The integrated guidance system includes a position determination system adapted for determining a current position. Additionally, the integrated guidance system further includes a lightbar device adapted for providing a visual representation of the deviation of the current position from a desired path to guide movement along the desired path. Furthermore, the integrated guidance system has a data input device, and a display device for displaying text and graphics. Moreover, the integrated guidance system includes a user interface system adapted for facilitating user interaction by integrating operation of the position determination system, the lightbar device, the data input device, and the display device. In an embodiment, the user interface system comprises a processor and processor-executable instructions for implementing a user interface.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Rather than being a collection of separate components coupled with cables, the integrated guidance system of the present invention comprises a plurality of guidance components and a housing for the plurality of guidance components, whereas the guidance components operate in an integrated manner via a user interface to enhance user interaction with the integrated guidance system. Thus, the need for cables is significantly reduced or eliminated. Moreover, unlike other guidance systems, the operator of a mechanical system that is capable of movement, such as, for example, a vehicle, can easily use the integrated guidance system of the present invention while operating the mechanical system.

It should be understood that the integrated guidance system of the present invention can be utilized by an operator of any type of mechanical system that is capable of movement. Although the present discussion will focus on guidance of vehicles such as, for example, agricultural vehicles and equipment, the invention is not limited to guidance and use by operators of vehicles (e.g., agricultural vehicles and equipment).

Figure 1A:
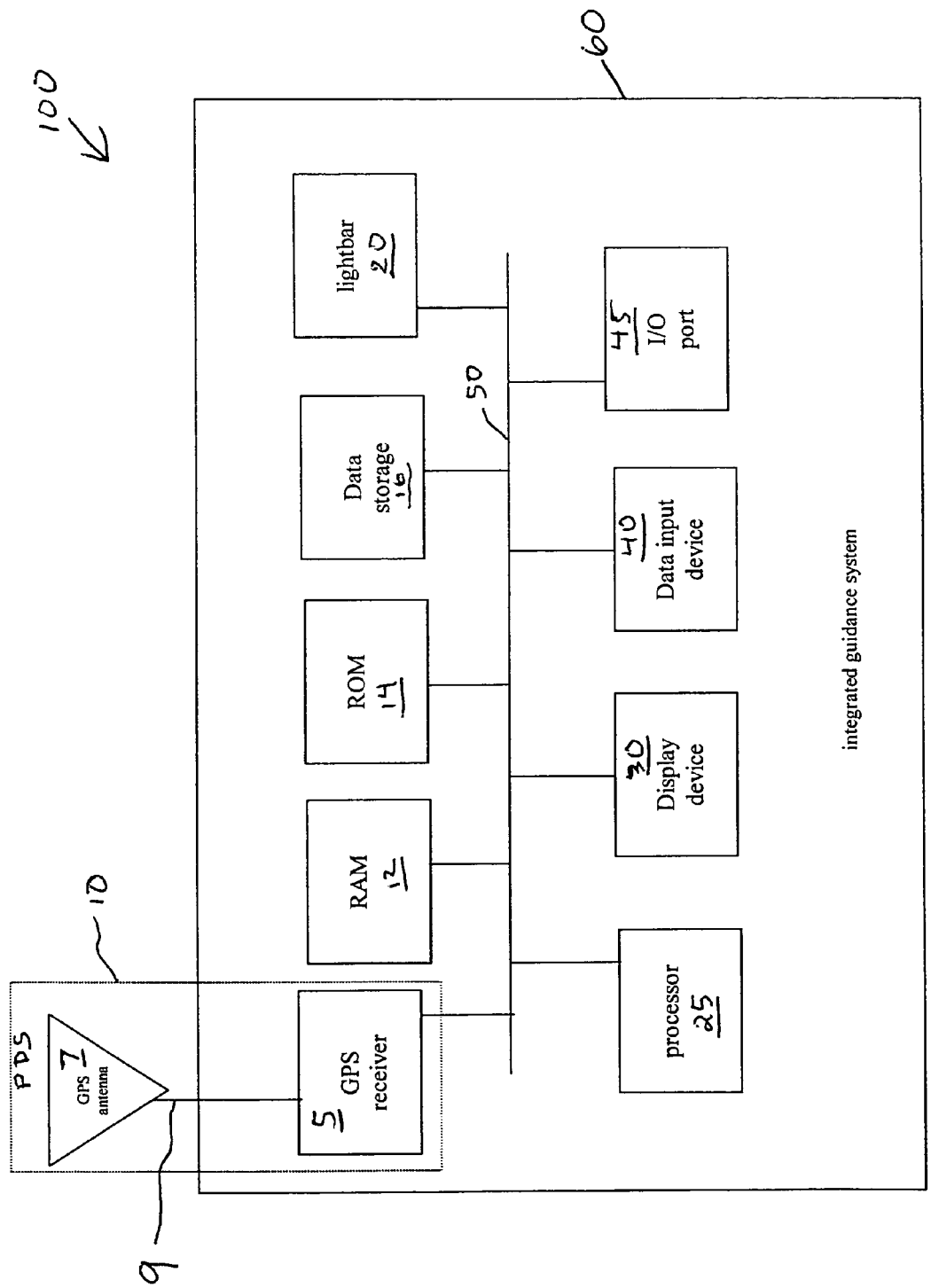
FIG. 1A illustrates a block diagram of an integrated guidance system in accordance with an embodiment of the present invention.
Figure 1B:
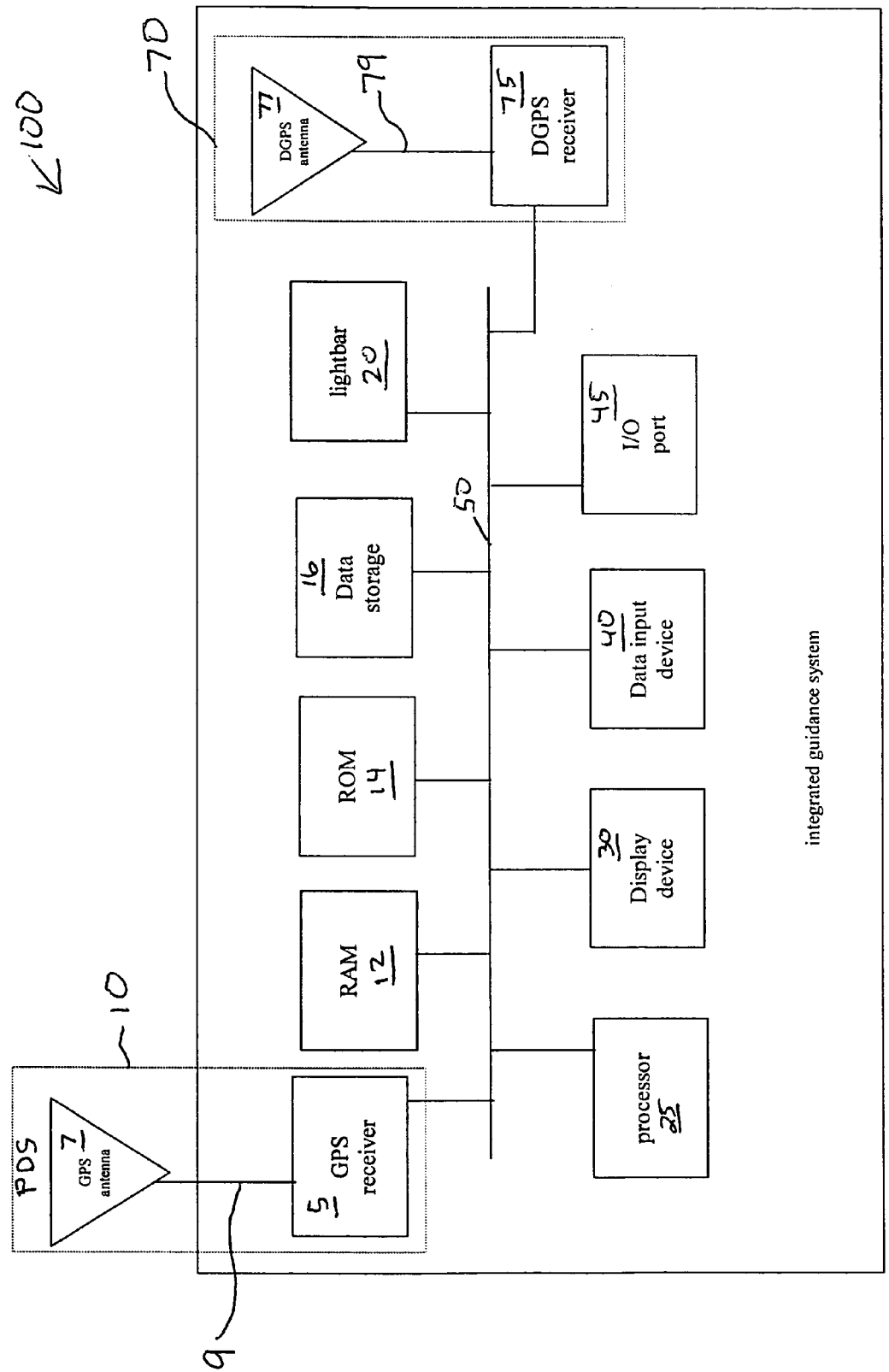
FIG. 1B illustrates a block diagram of an integrated guidance system in accordance with another embodiment of the present invention.

FIG. 1A illustrates a block diagram of an integrated guidance system 100 in accordance with an embodiment of the present invention. Moreover, FIG. 1B illustrates a block diagram of an integrated guidance system 100 in accordance with another embodiment of the present invention. For guidance operation, the integrated guidance system 100 can be mounted on the dash or ceiling of a vehicle such as, a tractor.

Referring to FIGS. 1A and 1B, the integrated guidance system 100 includes a position determination system (PDS) 10, a lightbar 20, a display device 30, a data input device 40, a I/O port 45, and a housing 60. Moreover, the integrated guidance system 100 further includes a processor 25, random access memory (RAM) 12, read only memory (ROM) 14, data storage 16, and a bus 50. Additionally, in FIG. 1B, the integrated guidance system 100 includes a position correction system 70. It should be understood that the integrated guidance system 100 can have other components and configurations.

As shown in FIGS. 1A and 1B, the integrated guidance system 100 includes the position determination system 10 adapted for determining a current position of the vehicle. The position determination system 10 utilizes a process of triangulation from several satellites, which are transmitting position determination signals, to determine the current position of the vehicle. In an embodiment, the position determination system 10 utilizes satellites of the Global Positioning System. The position determination system 10 includes a Global Positioning System (GPS) receiver 5, a GPS antenna 7, and a cable 9 for coupling the GPS receiver 5 and the GPS antenna 7. Since the received GPS signals from the GPS satellites may not be strong enough inside the vehicle, the GPS antenna 7 is positioned outside the vehicle (e.g., mounted on the roof of the vehicle). Hence, the GPS antenna 7 is positioned externally and separately relative to the GPS receiver 5 and housing 60 of the integrated guidance system 100. It should be understood that the GPS receiver 5 and the GPS antenna 7 can be integrated into the housing 60 of the integrated guidance system 100 if the received GPS signals from the GPS satellites are strong enough inside the vehicle or if after further processing and additional techniques the received GPS signals can be utilized for determining the current position of the vehicle. It should be understood that the position determination system 10 can be implemented to utilize position determination signals from other satellite-based systems, land-based systems, or hybrid (satellite-land) systems.

The accuracy of the current position of the vehicle determined by the position determination system 10 depends on factors such as time of the day, number of GPS satellites available, atmospheric conditions, accuracy of components, etc. These factors introduce errors in the determination of the current position of the vehicle.

A process known as differential correction can correct many of these errors. Differential GPS is an enhanced form of GPS. Differential GPS positions are more accurate than regular GPS positions. Differential GPS positions are regular GPS positions that have been corrected for atmospheric conditions and other errors using the process of differential correction. Typically, differential correction uses a GPS reference station—a GPS station that has a well-known location—to provide corrections for other GPS receivers that are at unknown locations (such as on a vehicle).

Differential corrections may be applied second-by-second in real time. These are known as real-time differential corrections. Alternatively, differential corrections may also be stored in electronic files and accessed later.

There are many sources of differential corrections. These sources include a short-range radio link from a local GPS reference station, a medium-range radio link from maritime or land-based beacons, and geo-stationary satellites. Geo-stationary satellites use multiple land-based reference stations to create a differential correction map over very large areas of the earth. One of these systems is the Wide Area Augmentation System (WAAS).

In an embodiment of the present invention, differential correction capability is integrated into the position determination system 10 of FIG. 1A.

In another embodiment of the present invention as depicted in FIG. 1B, the position correction system 70 provides the differential correction capability. As described above in an embodiment of the present invention, the position determination system 10 utilizes satellites of the Global Positioning System. Thus, the position correction system 70 includes a Differential Global Positioning System (DGPS) receiver 75 for correcting errors in the GPS position using GPS differential corrections, a DGPS antenna 77 for GPS differential corrections, and a cable 79 for coupling the DGPS receiver 75 and the DGPS antenna 77. Alternatively, the DGPS receiver 75 and the DGPS antenna 77 can be coupled together without a cable 79. Moreover, in yet another embodiment, the DGPS antenna 77 is positioned outside the vehicle (e.g., mounted on the roof of the vehicle) because of the reasons described above in connection with the GPS antenna 7. Hence, the DGPS antenna 77 is positioned externally and separately relative to the DGPS receiver 75 and housing 60 of the integrated guidance system 100.

As shown in FIGS. 1A and 1B, the integrated guidance system 100 includes the lightbar device 20 (or lightbar 20) adapted for providing a visual representation of a deviation of the current position of the vehicle from a desired path to guide an operator in controlling movement of the vehicle along the desired path. FIGS. 2, 11A, 11B, and 11C illustrate the lightbar 20 in accordance with an embodiment of the present invention. The lightbar 20 includes lights that are adapted to emit a light pattern that indicates the deviation of the vehicle from the desired path. It should be understood that the lightbar 20 can have configurations other than that shown in FIGS.

2, 11A, 11B, and 11C. Operation of the lightbar 20 will be described in further detail below.

Referring to FIGS. 1A and 1B, the integrated guidance system 100 includes the display device 30 for displaying text and graphics. In an embodiment, the display device 30 is a liquid crystal display (LCD). The display device 30 can be implemented with other display technologies. Moreover, the display device 30 is compact to minimize obstructing the vision of the operator and to reduce the size of the integrated guidance system 100. In an embodiment, the display device 30 has the dimensions 2.5 inches×3.5 inches. Operation of the display device 30 will be described in further detail below.

Moreover, the integrated guidance system 100 includes the data input device 40. In an embodiment, the data input device 40 is adapted for enabling the operator to access and interact with any one of the available functions of the integrated guidance system 100 with a minimum number of inputs and with minimum use of the inputs. An "input" refers to a button, key, switch, or any other electronic or mechanical means for a user to communicate information such as, for example, data, a command, a selection or a choice, to an electronic device. In an embodiment, the data input device 40 includes a first input, a second input, and a third input, providing a user-friendly manner of interacting with the integrated guidance system 100. In an embodiment, the first, second, and third inputs are buttons.

Moreover, the first input, the second input, and the third input are conveniently positioned and integrated with the housing 60 for easy access by the operator. As a result, an operator can use without difficulty the integrated guidance system 100 while operating the vehicle, since distractions (e.g., too many inputs to select, position of the inputs is not convenient, need for visual assistance to distinguish inputs, etc.) originating from using the data input device by other guidance systems are significantly reduced. Operation of the data input device 40 will be described in further detail below.

As described above, the integrated guidance system 100 includes the processor 25, random access memory (RAM) 12, read only memory (ROM) 14, data storage 16, and the bus 50. In an embodiment, data storage 16 is implemented as flash memory. Moreover, one or more of these components (e.g., processor 25) form a user interface system adapted for facilitating user interaction by integrating operation of components, such as, for example, the position determination system (PDS) 10, the lightbar 20, the display device 30, the data input device 40, and the position correction system 70 (FIG. 1B). Additionally, the random access memory (RAM) 12, read only memory (ROM) 14, and data storage 16 can store processor-executable instructions for implementing a user interface for the integrated guidance system 100.

The user interface of the integrated guidance system 100 emphasizes simplicity and ease-of-use to enable an operator to safely operate the vehicle while operating the vehicle. In particular, the user interface displays the available functions of the integrated guidance system 100 on the display device 30. Moreover, the user interface displays the available functions in a menu-driven manner that is user friendly. Operation of the user interface will be described in further detail below.

Furthermore, the integrated guidance system 100 can be upgraded via the I/O port 45. Moreover, data can be download/uploaded via the I/O port 45. In an embodiment, the I/O port 45 is a serial port. The integrated guidance system 100 can have one or more I/O ports 45.

Figure 2:
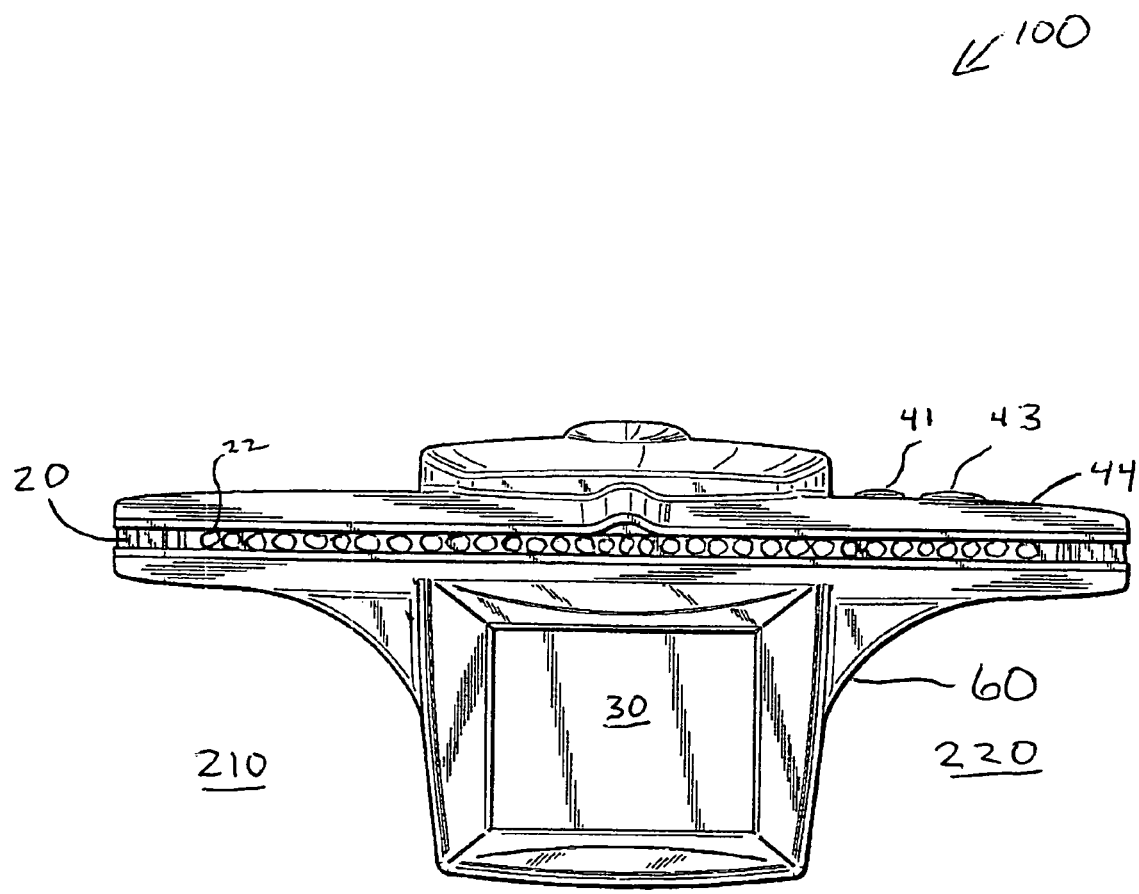
FIG. 2 illustrates a front elevational view of an integrated guidance system in accordance with an embodiment of the present invention.

FIG. 2 illustrates a front elevational view of an integrated guidance system 100 in accordance with an embodiment of the present invention. It should be understood that the integrated guidance system 100 can have other configurations.

The display device 30, the lightbar 20, and housing 60 are depicted in FIG. 2. The housing 60 is rugged and has several features that benefit the operator of the vehicle. Area 210 and area 220 are not blocked by the housing 60, reducing visual obstruction as the operator operates the vehicle and utilizes the integrated guidance system 100. Moreover, the first, second, and third inputs 41, 42 (not shown), and 43 of the data input device are positioned on a top surface 44 of the housing 60. In an embodiment, the first, second, and third inputs 41, 42 (not shown), and 43 are buttons 41-43.

The lightbar 20 includes a plurality of lights 22 that are adapted to emit a light pattern that indicates the deviation of the vehicle from the desired path. Also, the lights 22 are spaced apart and are aligned in a row. The light pattern is formed by selectively illuminating particular ones of the lights 22. In an embodiment, the lights 22 are light emitting diodes (LED's). In an embodiment, several colors are visible when the plurality of lights 22 are illuminated. For example, a first quantity of lights 22 emit a first color, a second quantity of lights 22 emit a second color, a third quantity of lights 22 emit a third color, and so on. Examples of these colors include red, green, and yellow.

Figure 3:
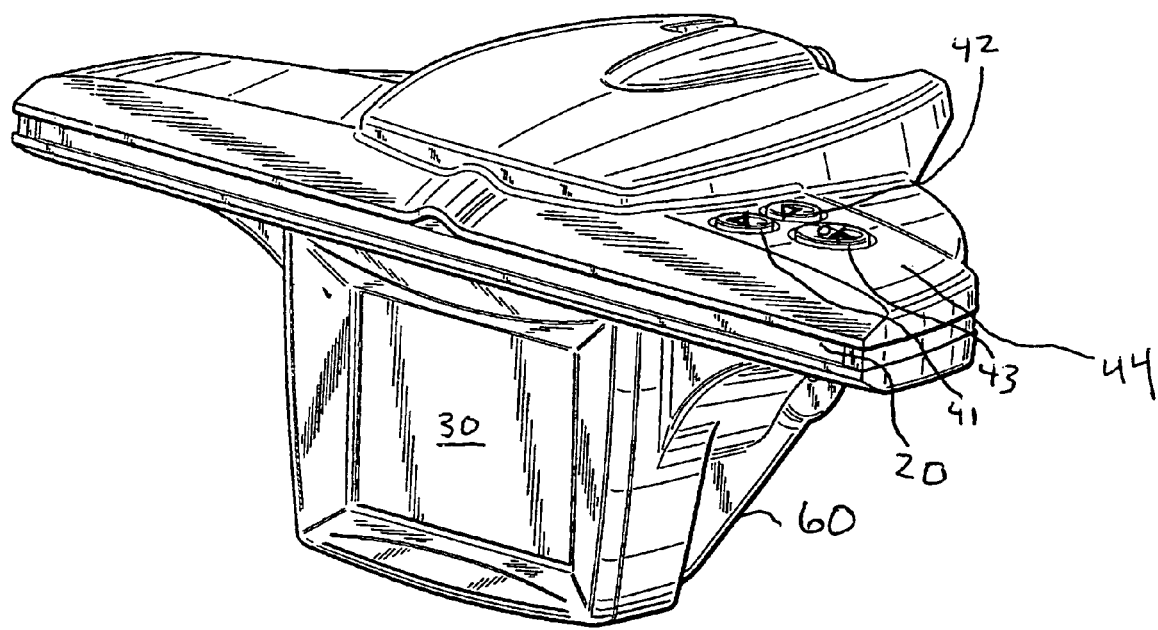
FIG. 3 illustrates an upper right frontal perspective view of an integrated guidance system in accordance with an embodiment of the present invention.

FIG. 3 illustrates an upper right frontal perspective view of an integrated guidance system 100 in accordance with an embodiment of the present invention. The display device 30, the lightbar 20, the buttons 41-43, and the housing 60 are shown. The buttons 41-43 are positioned on the top surface 44 of the housing 60 for convenient access by the operator. The lights 22 (FIG. 2) of the lightbar 20 are not visible from this perspective view because the lights 22 (FIG. 2) are located at an interior position that is out of the scope of this perspective view.

Figure 4:
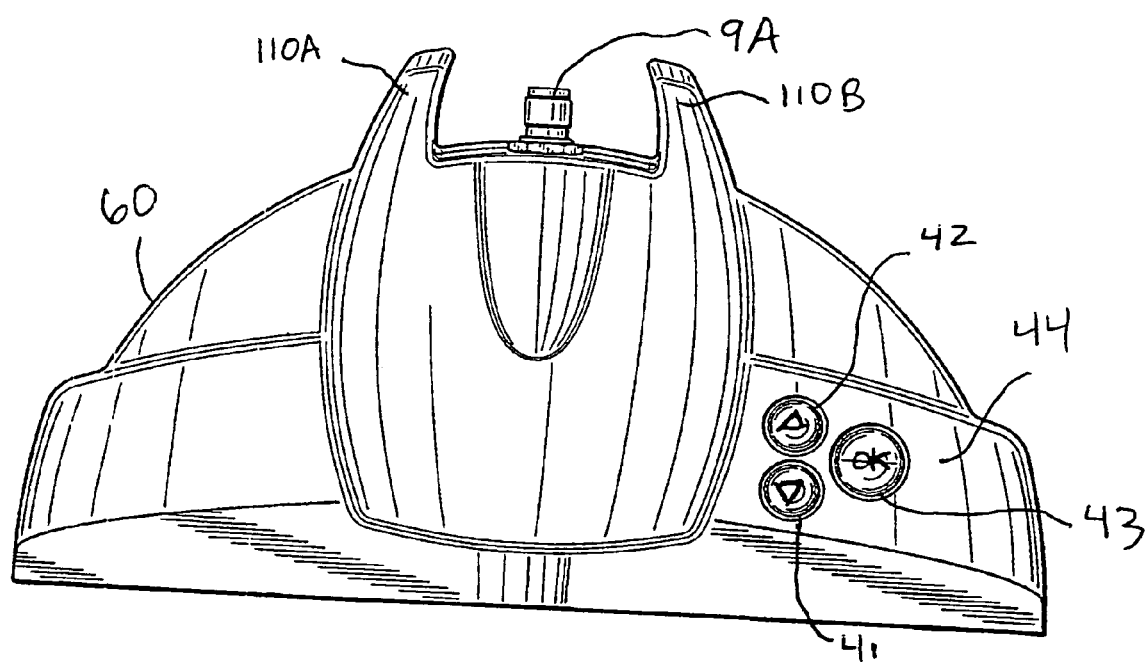
FIG. 4 illustrates a top plan view of an integrated guidance system in accordance with an embodiment of the present invention.

Continuing to FIG. 4, a top plan view of an integrated guidance system 100 in accordance with an embodiment of the present invention is illustrated. The buttons 41-43, the housing 60, a top surface 44 of the housing 60, and a connector 9A for the cable that couples the GPS receiver and the GPS antenna are shown in FIG. 4. Buttons 41-42 are smaller than button 43. Moreover, the housing 60 has a first wing-shaped portion 110A and a second wing-shaped portion 110B. The first wing-shaped portion 110A and the second wing-shaped portion 110B protect the connector 9A that extends from a rear surface of the housing 60, increasing the reliability of the integrated guidance system 100.

Figure 5:
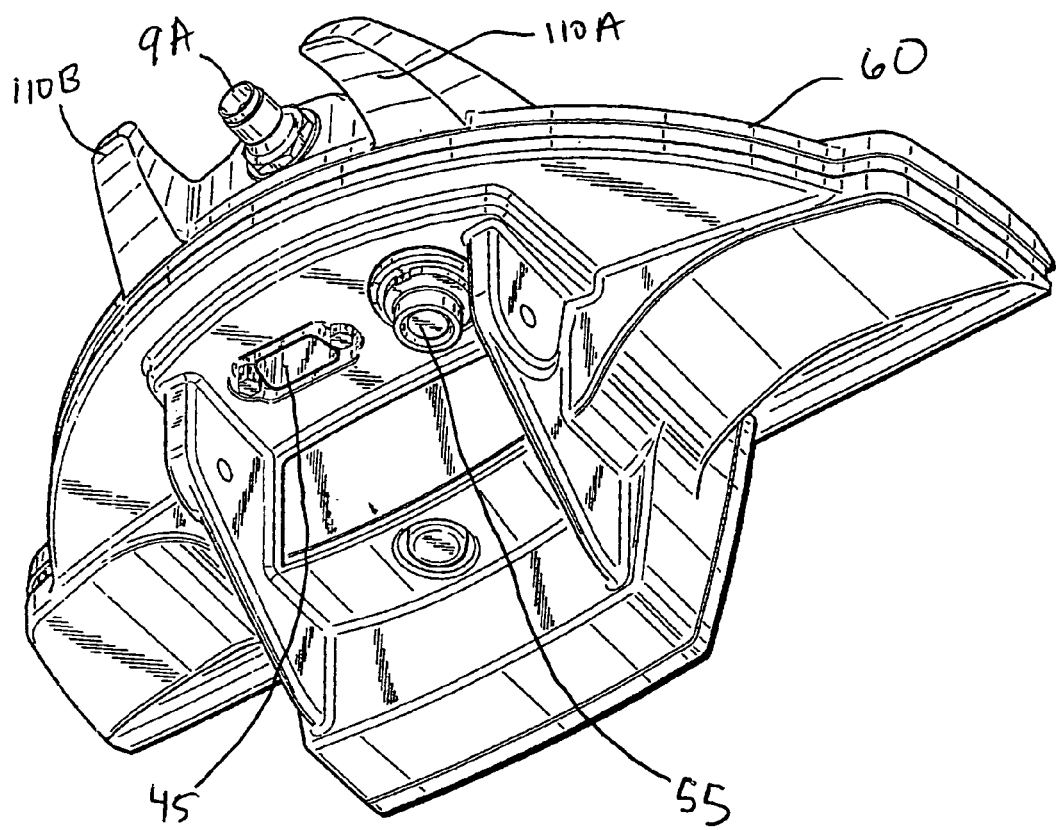
FIG. 5 illustrates a lower left rear perspective view of an integrated guidance system in accordance with an embodiment of the present invention.

A lower left rear perspective view of an integrated guidance system 100 in accordance with an embodiment of the present invention is illustrated in FIG. 5. The housing 60, the I/O port 45, the first wing-shaped portion 110A, the second wing-shaped portion 110B, and the connector 9A for the cable that couples the GPS receiver and the GPS antenna are shown in FIG. 5. Moreover, the connector 55 can be utilized for one of various uses. The I/O port 45 and the connector 55 are positioned on a bottom surface of the housing 60.

Figure 6:
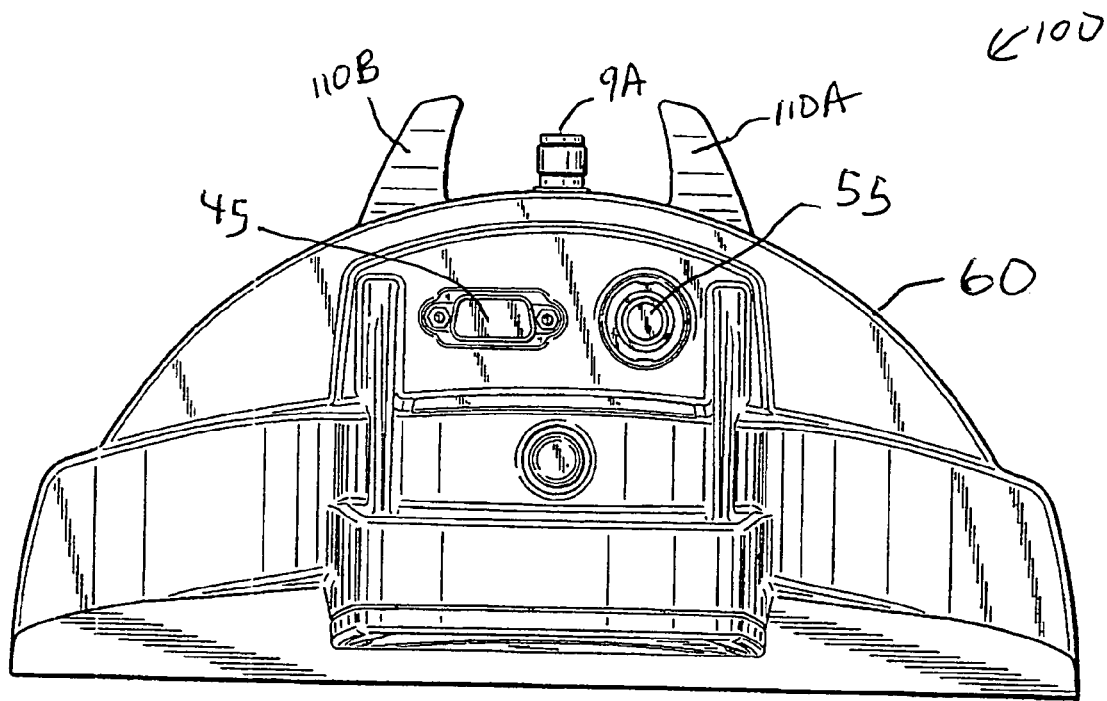
FIG. 6 illustrates a bottom plan view of an integrated guidance system in accordance with an embodiment of the present invention.
Figure 7:
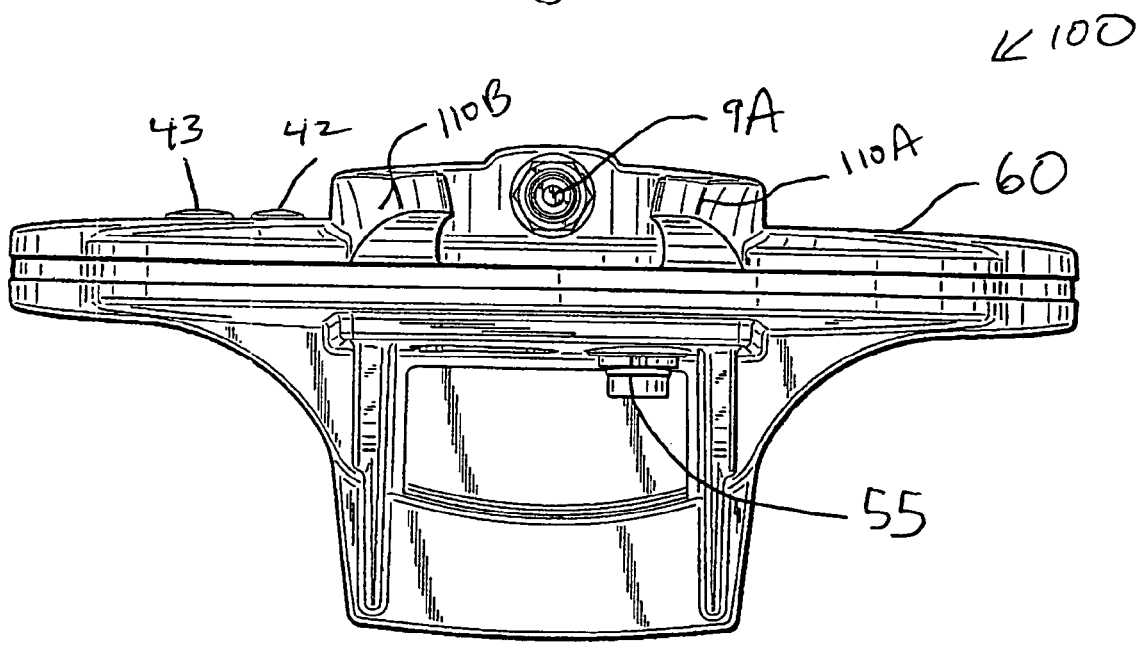
FIG. 7 illustrates a rear elevational view of an integrated guidance system in accordance with an embodiment of the present invention.

FIG. 6 illustrates a bottom plan view of an integrated guidance system 100 in accordance with an embodiment of the present invention. The housing 60, the I/O port 45, the first wing-shaped portion 110A, the second wing-shaped portion 110B, the connector 55, and the connector 9A for the cable that couples the GPS receiver and the GPS antenna are shown in FIG. 6. FIG. 7 illustrates a rear elevational view of an integrated guidance system 100 in accordance with an embodiment of the present invention. The housing 60, the connector 55, buttons 42-43, the first wing-shaped portion 110A, the second wing-shaped portion 110B, and the connector 9A for the cable that couples the GPS receiver and the GPS antenna are shown in FIG. 7.

Figure 8:
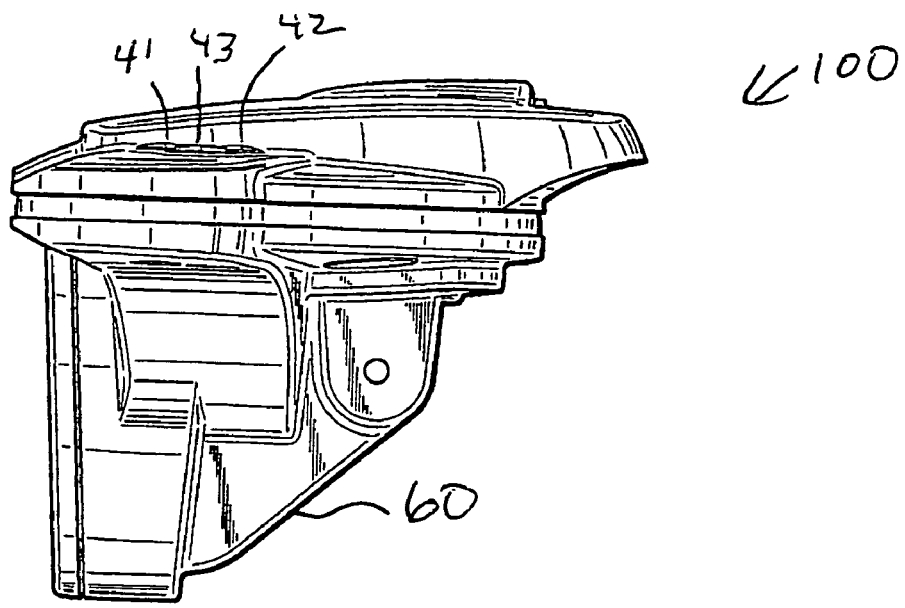
FIG. 8 illustrates a right side elevational view of an integrated guidance system in accordance with an embodiment of the present invention.
Figure 9:
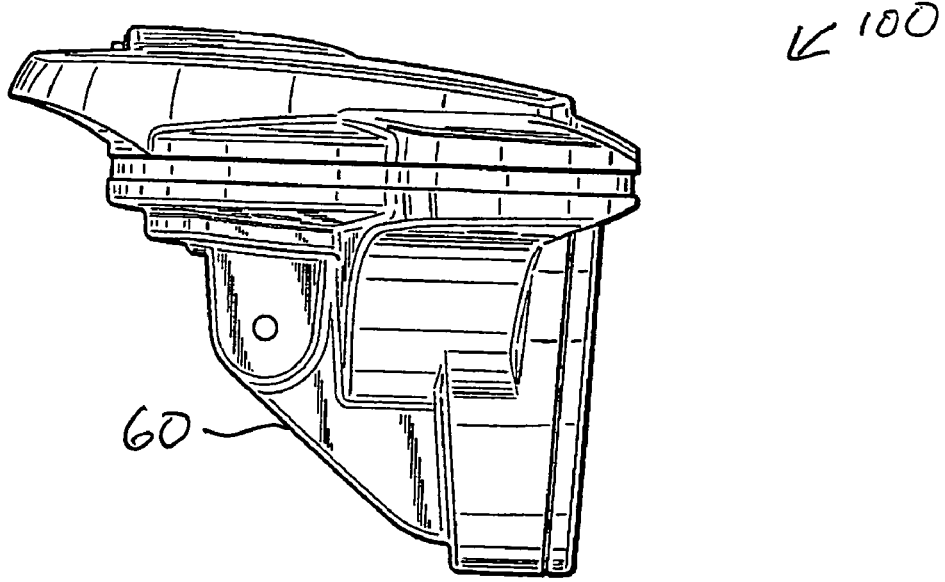
FIG. 9 illustrates a left side elevational view of an integrated guidance system in accordance with an embodiment of the present invention.

A right side elevational view of an integrated guidance system 100 in accordance with an embodiment of the present invention is illustrated in FIG. 8, showing the housing 60 and buttons 41-43. Furthermore, FIG. 9 illustrates a left side elevational view of an integrated guidance system 100 in accordance with an embodiment of the present invention, showing the housing 60.

Figure 10:
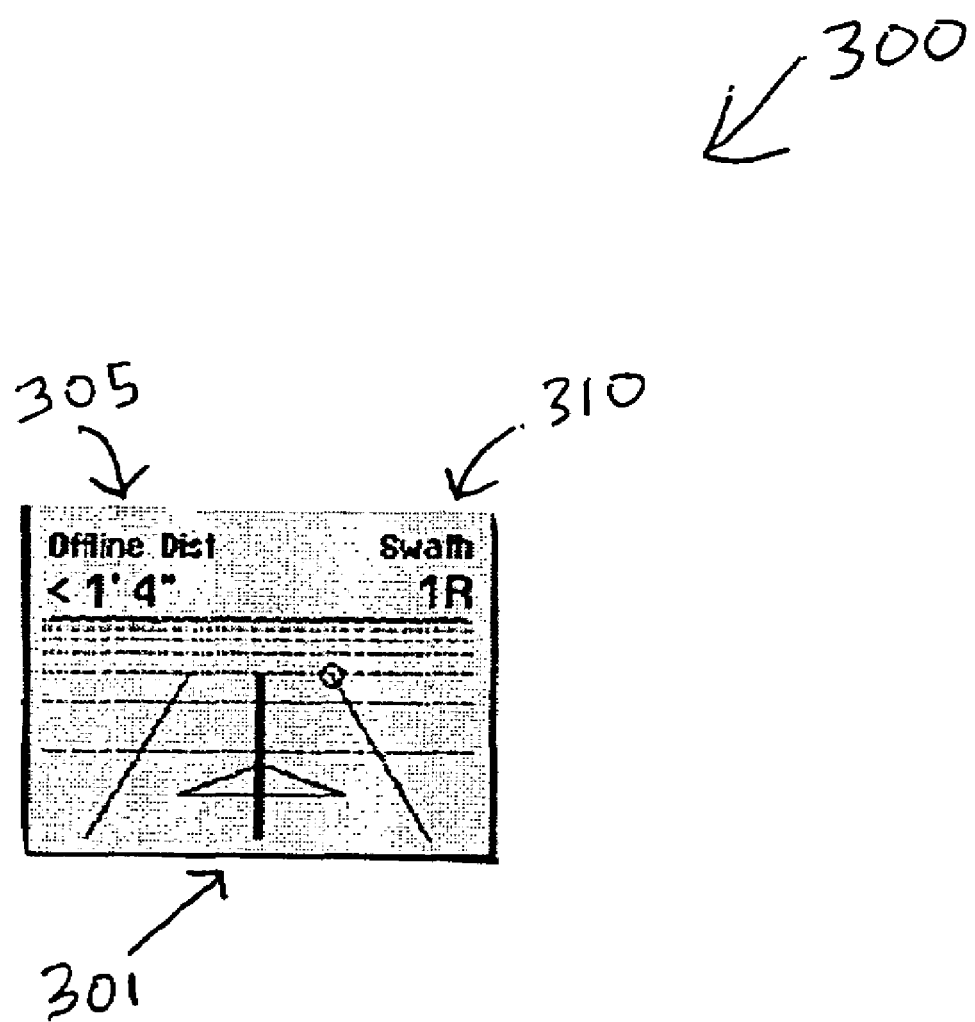
FIG. 10 illustrates an exemplary screen that is displayed on a display device of an integrated guidance system in accordance with an embodiment of the present invention.

FIG. 10 illustrates an exemplary screen 300 that is displayed on the display device 30 of an integrated guidance system 100 in accordance with an embodiment of the present invention. As depicted in FIG. 10, the exemplary screen 300 includes text and graphics. Moreover, the exemplary screen 300 is not cluttered. A perspective view graphic 301 to assist in guiding the operator covers a portion of the exemplary screen 300 while text 305 that indicates the deviation of the vehicle from the desired path and text 310 that describes the desired path cover another portion of the exemplary screen 300. Moreover, the information (e.g., text and graphics) on the exemplary screen 300 is designed to be viewable under various light conditions (e.g., in sunlight or in the middle of the night). Moreover, the operator is able to vary the contrast and brightness by using the buttons 41-43 to interact with the user interface of the integrated guidance system 100.

Figure 11A:
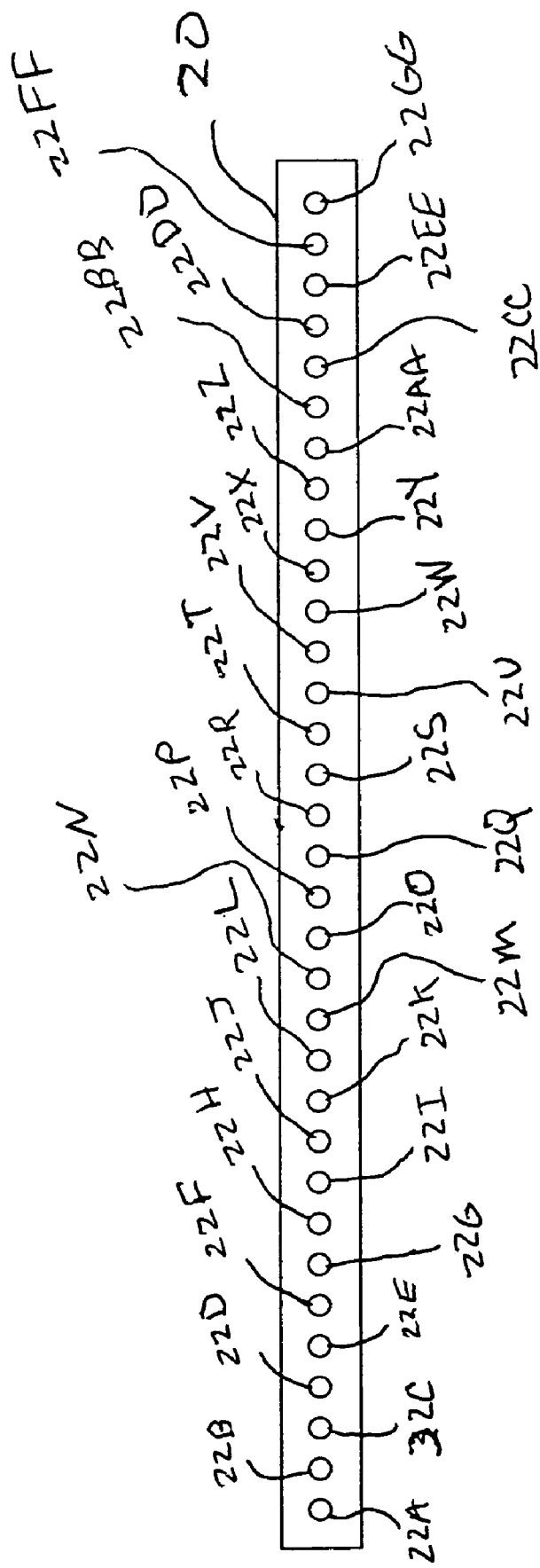
FIG. 11A illustrates a lightbar of an integrated guidance system in accordance with an embodiment of the present invention.

FIG. 11A illustrates a lightbar 20 of an integrated guidance system 100 in accordance with an embodiment of the present invention. As illustrated in FIG. 11A, the lightbar 20 includes a plurality of lights 22A-22FF that are adapted to emit a light pattern that indicates the deviation of the vehicle from the desired path. Also, the lights 22A-22FF are spaced apart and are aligned in a row. The light pattern is formed by selectively illuminating particular ones of the lights 22A-22FF. In an embodiment, the lights 22A-22FF are light emitting diodes (LED's). In an embodiment, several colors are visible when the plurality of lights 22A-22FF are illuminated.

The lightbar 20 gives the operator guidance feedback via the lights 22A-22FF that indicate to the operator the deviation (distance to the left or right of the desired path) of the current position that the vehicle is traveling. The aim is to operate the vehicle so that the light pattern of the lightbar 20 is formed by illumination of the center lights (e.g., 22P, 22Q, and 22R) of the lightbar 20. In an embodiment, the center lights 22P-22R are green LED's.

Figure 11B:
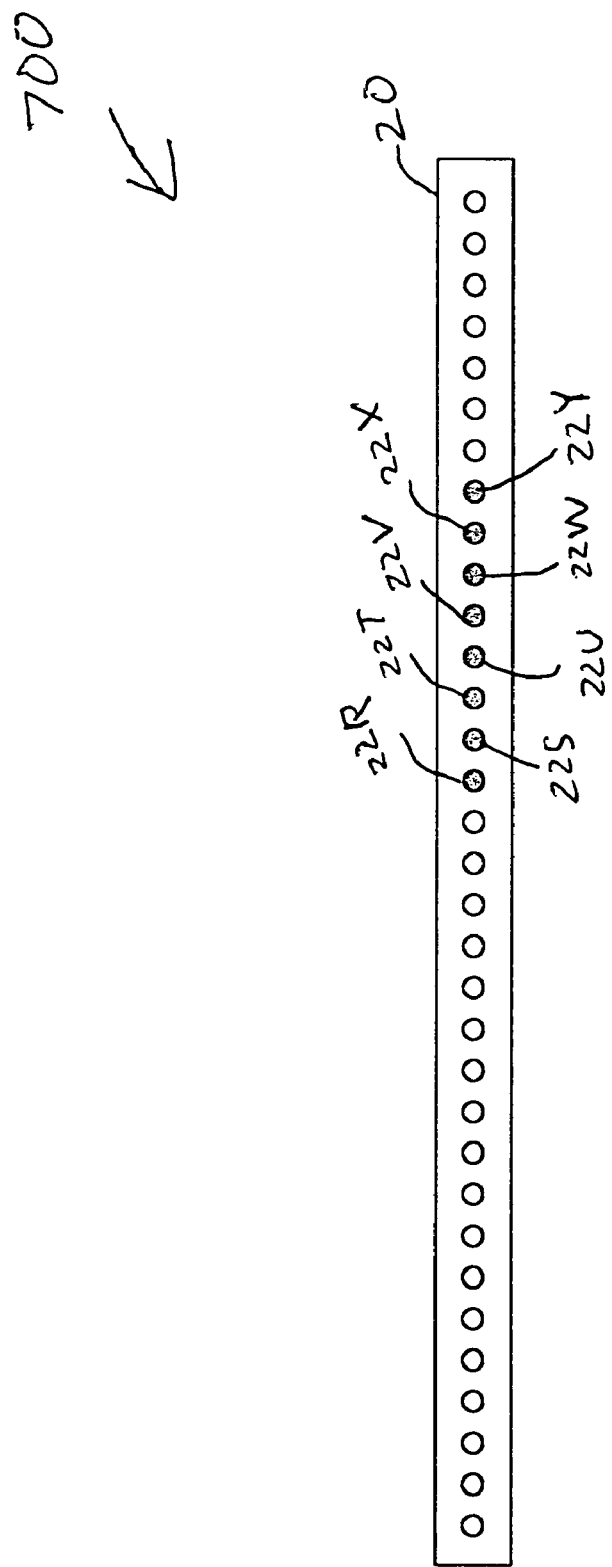
FIG. 11B illustrates a first light pattern emitted by a lightbar of an integrated guidance system in accordance with an embodiment of the present invention.

FIG. 11B illustrates a first light pattern 700 emitted by a lightbar 20 of an integrated guidance system 100 in accordance with an embodiment of the present invention. The first light pattern 700 is formed by the illumination of lights 22R-22Y. In an embodiment, the lights 22R-22Y are red LED's. This indicates to the operator that the vehicle should be moved to the left to guide the vehicle along the desired path. As the operator moves the vehicle towards the left, another light pattern is formed. It should be understood that the first light pattern 700 can also be configured to indicate that the operator has to move the vehicle to the right in order to reduce the deviation from the desired path.

Figure 11C:
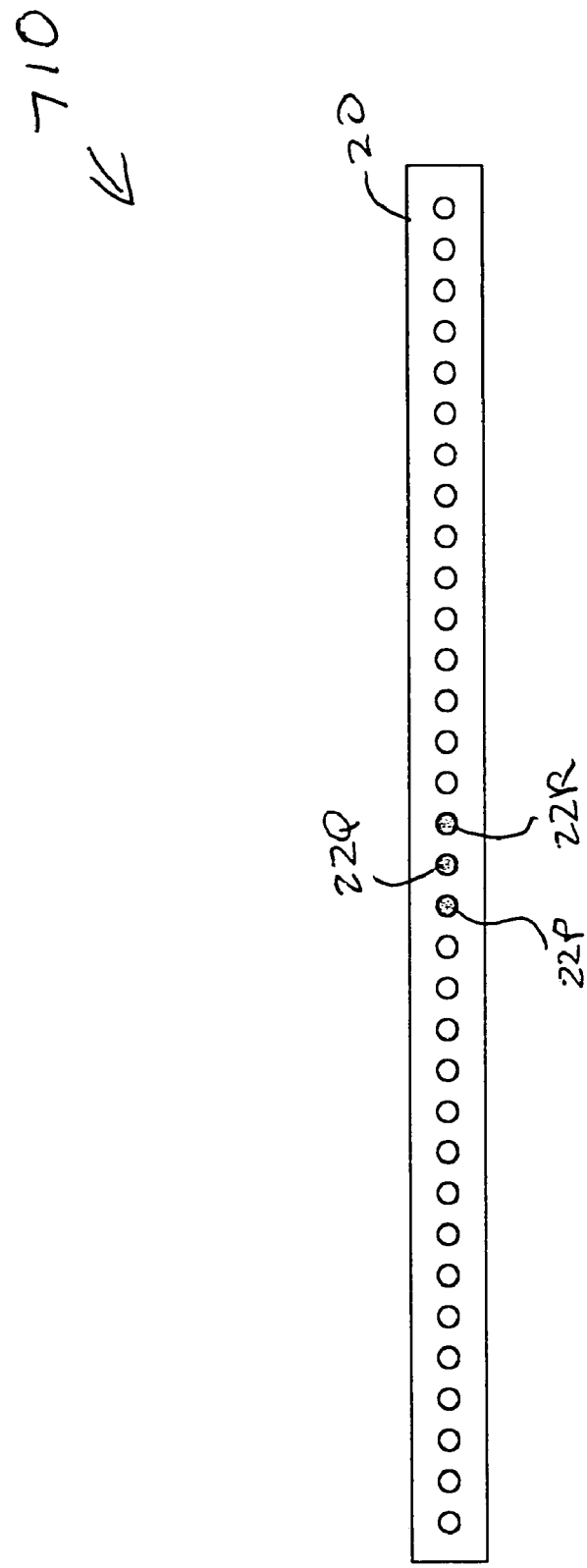
FIG. 11C illustrates a second light pattern emitted by a lightbar of an integrated guidance system in accordance with an embodiment of the present invention.

Continuing with FIG. 11C, a second light pattern 710 emitted by a lightbar 20 of an integrated guidance system 100 in accordance with an embodiment of the present invention is illustrated. The second light pattern 710 is formed by the illumination of lights 22P-22R. Here, the second light pattern 710 is centered, indicating that the vehicle is moving along the desired path. Thus, the operator does not need to make a correction in the movement of the vehicle.

Figure 12A:
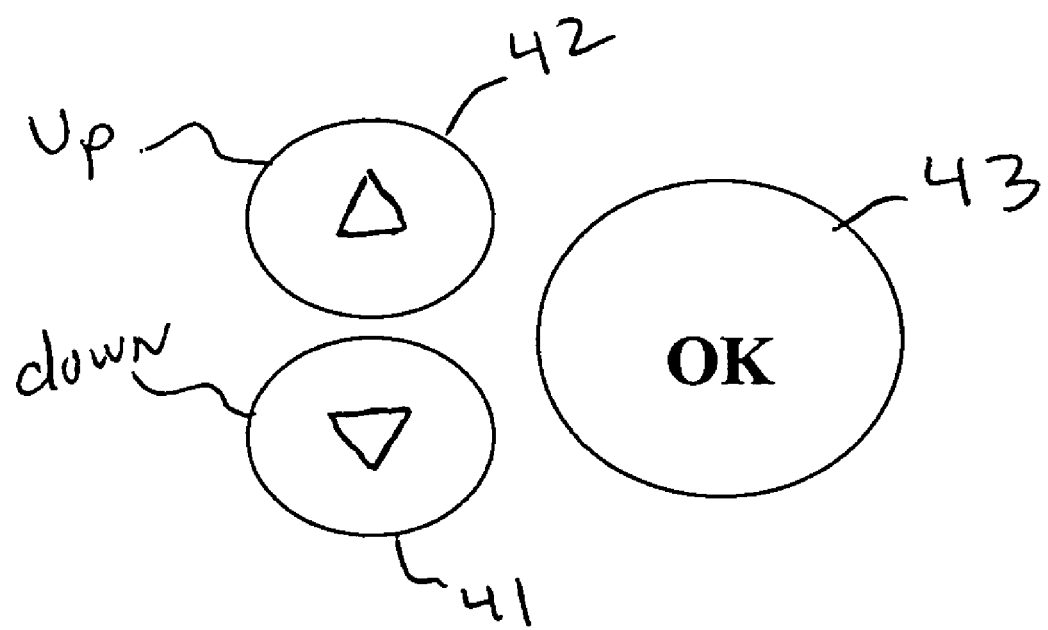
FIG. 12A illustrates a plurality of inputs of a data input device of an integrated guidance system in accordance with an embodiment of the present invention.

FIG. 12A illustrates a plurality of inputs 41-43 of a data input device 40 of an integrated guidance system 100 in accordance with an embodiment of the present invention. In an embodiment, the inputs 41-43 are buttons 41-43. The buttons 41-43 and the user interface of the integrated guidance system 100 enable intuitive and simple interaction by the operator with the integrated guidance system 100. The buttons 41-43 and the user interface of the integrated guidance system 100 enable the operator to access and interact with any one of the available functions of the integrated guidance system 100 with a minimum number of buttons 41-43 and with minimum use of the buttons 41-43.

The following discussion provides exemplary use of buttons 41-43 when the integrated guidance system 100 is utilized in agriculture by operators of agricultural vehicles and equipment. When the integrated guidance system 100 is in guidance mode, the button 43 (or OK) is pressed to set the A and B points of various guidance patterns. When the integrated guidance system 100 is in boundary mapping mode, the button 43 (or OK) is pressed to start the boundary mapping and to stop the boundary mapping. When the integrated guidance system 100 is in a screen, menu item, or edit screen, the button 43 (or OK) is pressed to select/accept based on screen/menu item context. The button 41 (or down arrow) is pressed to go to the next screen or menu item. Moreover, in the edit screen, the button 41 (or down arrow) is pressed to decrease a value in that edit screen. The button 42 (or up arrow) is pressed to go to the previous screen or menu item. Moreover, in the edit screen, the button 42 (or up arrow) is pressed to increase a value in that edit screen.

Figure 12B:
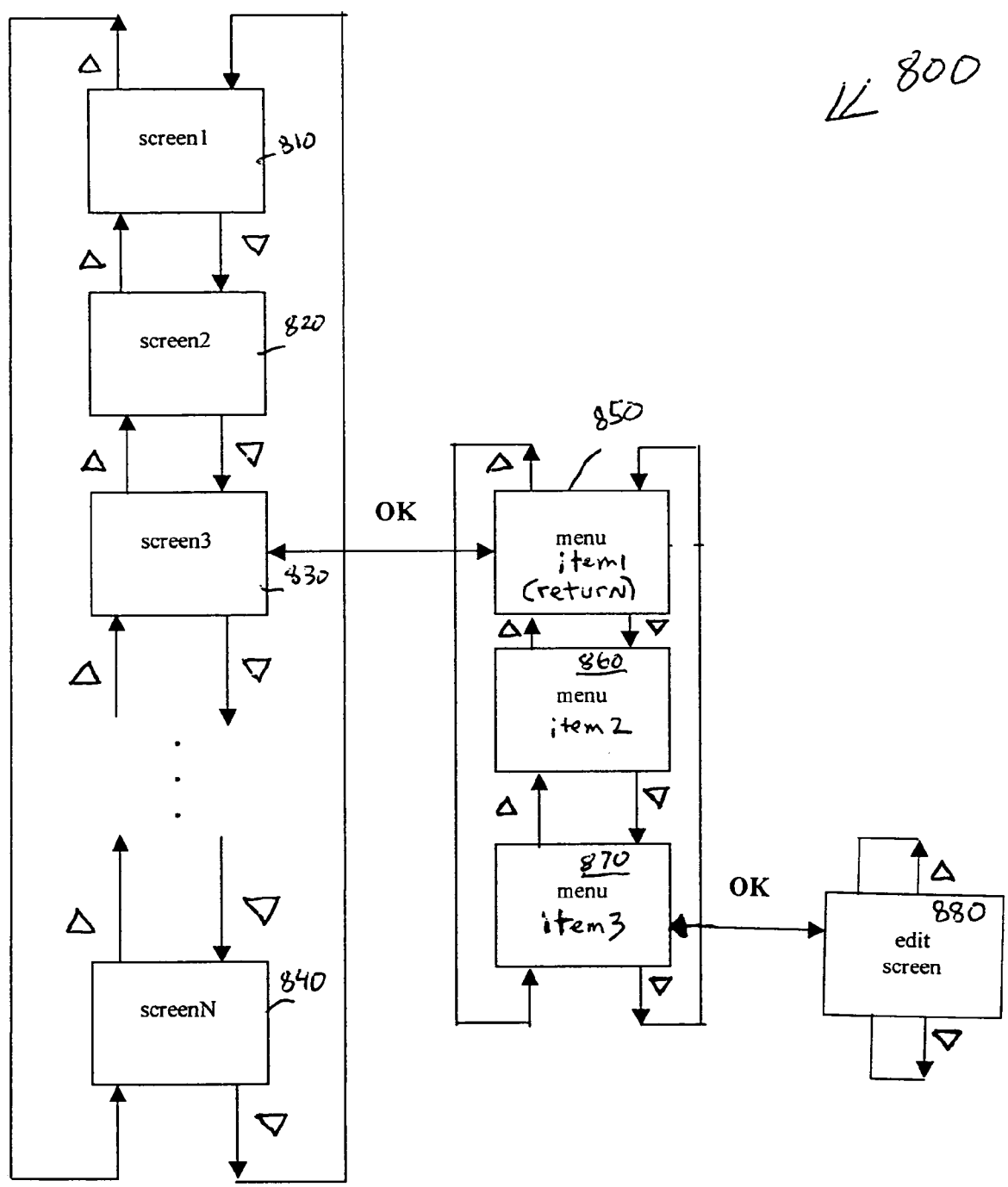
FIG. 12B illustrates an exemplary flow chart showing the menu structure and user operation of an integrated guidance system using the buttons 41-43 of FIG. 12A in accordance with an embodiment of the present invention.

Furthermore, FIG. 12B illustrates an exemplary flow chart 800 showing the menu structure and user operation of an integrated guidance system 100 using the buttons 41-43 of FIG. 12A in accordance with an embodiment of the present invention. The available functions of the integrated guidance system 100 are displayed in a menu-driven manner that is user friendly. The button 42 (or up arrow) and the button 41 (or down arrow) enable the operator to scroll or rotate through the screens (e.g., screen1 810-screenN 840). If the button 43 (or OK) is pressed while in one of the screens (e.g., screen1 810-screenN 840), the operator is provided access to the menu items of the current screen. For example, if screen3 840 is the configuration screen, the operator can then enter a configuration mode and access the configuration menu items (e.g., menu item1 850-menu item3 870). The button 42 (or up arrow) and the button 41 (or down arrow) enable the operator to scroll or rotate through the configuration menu items (e.g., menu item1 850-menu item3 870). The menu items (e.g., menu item1 850-menu item3 870) represent the available options for the operator to select and edit. Moreover, one of the configuration menu items (e.g., menu item1 850-menu item3 870) represents "return", enabling the operator to exit the configuration menu items (e.g., menu item1 850-menu item3 870) and return to the screens (e.g., screen1 810-screenN 840).

If the button 43 (or OK) is pressed while one of the menu items other than "return" (e.g., menu item2 860 or menu item3 870) is selected, the operator is able to edit the menu item in the edit screen 880. Moreover, in the edit screen 880, the button 41 (or down arrow) is pressed to decrease a value in that edit screen 880. Additionally, in the edit screen 880, the button 42 (or up arrow) is pressed to increase a value in that edit screen 880. When finished editing, the operator presses the button 43 (or OK) to save the changes and return to the configuration menu items (e.g., menu item1 850-menu item3 870). Finally, the operator scrolls to the menu item1 850, which represents "return", and presses the button 43 (or OK) to exit configuration mode and the configuration menu items (e.g., menu item1 850-menu item3 870) and to return to the screens (e.g., screen1 810-screenN 840).

Thus, the integrated guidance system 100 of the present invention overcomes the disadvantages of other guidance systems. The integrated guidance system 100 integrates the operation of various components for guidance applications, whereas the integration enables a single housing for the integrated guidance system 100. Moreover, the operator interaction with the integrated guidance system 100 is intuitive, simple, and safe under various conditions that the operator may encounter while operating the vehicle.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An integrated guidance system comprising:
   a position determination system adapted for determining a current position;
   a differential global position determination system adapted for using a differential correction process to correct errors, wherein a differential correction may be stored in an electronic file and accessed later or said differential correction may be applied in real time;
   a lightbar device adapted for providing a visual representation of a deviation of said current position from a desired path to guide movement along said desired path;
   a data input device for scrolling, selecting, and editing operations, including configuring said position determining system with a menu, and wherein said data input device comprises a first button, a second button, and a third button;
   a display device for displaying text, said menu and graphics, said text, said menu, and said graphics adapted to be viewable under various light conditions, wherein an operator is able to vary the contrast and brightness of said text, said menu, and said graphics by using buttons to interact with a user interface of said integrated guidance system, and wherein said first button, said second button, and said third button facilitate interacting with a plurality of available functions displayed on said display device, and wherein said display device is configured for presenting a perspective view graphic to assist in guidance along with first text that describes said desired path and second text that describes deviation from said desired path;
   a processor adapted for facilitating user interaction by integrating operation of said position determination system, said lightbar device, said data input device, and said display device; and
   a housing enclosing said position determination system, said lightbar device, said data input device, said display device and said processor, wherein said housing has a first wing-shaped portion and a second wing-shaped portion configured to protect a cable connector extending from said housing, wherein said light bar and said display device are positioned on a front of said housing, and wherein said first button, said second button, and said third button of said data input device are positioned on a top surface of said housing for convenient access by an operator of said integrated guidance system, wherein said top surface of said housing is substantially orthogonally adjacent to said front of said housing, and wherein said first button is larger than said second button and said third button to reduce the need for visual assistance by said operator to distinguish said first button, said second button, and said third button.

2. The integrated guidance system as recited in claim 1 wherein said position determination system comprises:
   a Global Positioning System (GPS) antenna; and
   a GPS receiver.

3. The integrated guidance system as recited in claim 2 wherein said GPS antenna is positioned externally and separately relative to said GPS receiver.

4. The integrated guidance system as recited in claim 1 wherein said lightbar device comprises a plurality of lights that are adapted to emit a light pattern that indicates said deviation.

5. The integrated guidance system as recited in claim 4 wherein said plurality of lights are spaced apart and are aligned in a row, and wherein said light pattern if formed selectively illuminating particular ones of said plurality of lights.

6. The integrated guidance system as recited in claim 4 wherein said plurality of lights comprises a plurality of light emitting diodes (LEDs).

7. The integrated guidance system as recited in claim 1 wherein said display device displays said available functions in a menu-driven manner that is user friendly.

8. The integrated guidance system as recited in claim 1 wherein said display device comprises a liquid crystal display (LCD).

9. An integrated guidance system comprising:
   a position determination system adapted for determining a current position;
   a differential global position determination system adapted for using a differential correction process to correct errors, wherein a differential correction may be stored in an electronic file and accessed later or said differential correction may be applied in real time;
   a lightbar device adapted for providing a visual representation of a deviation of said current position from a desired path to guide movement along said desired path;
   a data input device for scrolling, selecting, and editing operations, including configuring said position determining system with a menu, and wherein said data input device comprises a first button, a second button, and a third button;
   a display device for displaying text, said menu and graphics, said text, said menu, and said graphics adapted to be viewable under various light conditions, wherein an operator is able to vary the contrast and brightness of said text, said menu, and said graphics by using buttons to interact with a user interface of said integrated guidance system, and wherein said first button, said second button, and said third button facilitate interacting with a plurality of available functions displayed on said display device, and wherein said display device is configured for presenting a perspective view graphic to assist in guidance along with first text that describes said desired path and second text that describes deviation from said desired path;
   a user interface system adapted for facilitating user interaction by integrating operation of said position determination system, said lightbar device, said data input device, and said display device; and
   a housing enclosing said position determination system, said lightbar device, said data input device, said display device, and said user interface, wherein said housing has a first wing-shaped portion and a second wing-shaped portion configured to protect a cable connector extending from said housing, wherein said light bar and said display device are positioned on a front of said housing, and wherein said first button, said second button, and said third button of said data input device are positioned on a top surface of said housing for convenient access by an operator of said integrated guidance system, wherein said top surface of said housing is substantially orthogonally adjacent to said front of said housing, and wherein said first button is larger than said second button and said third button to reduce the need for visual assistance by said operator to distinguish said first button, said second button, and said third button.

10. The integrated guidance system as recited in claim 9 wherein said position determination system comprises:
    a Global Positioning System (GPS) antenna; and
    a GPS receiver.

11. The integrated guidance system as recited in claim 10 wherein said GPS antenna is positioned externally and separately relative to said GPS receiver.

12. The integrated guidance system as recited in claim 9 wherein said lightbar device comprises a plurality of lights that are adapted to emit a light pattern that indicates said deviation.

13. The integrated guidance system as recited in claim 12 wherein said plurality of lights are spaced apart and are aligned in a row, and wherein said light pattern is formed by selectively illuminating particular ones of said plurality of lights.

14. The integrated guidance system as recited in claim 12 wherein said plurality of lights comprises a plurality of light emitting diodes (LEDs).

15. The integrated guidance system as recited in claim 9 wherein said user interface system comprises:
    a processor; and
    processor-executable instructions for implementing a user interface.

16. The integrated guidance system as recited in claim 9 wherein said user interface system displays on said display device said available functions in a menu-driven manner that is user friendly.

17. The integrated guidance system as recited in claim 9 wherein said display device comprises a liquid crystal display (LCD).

18. A method of interacting with a guidance system, said method comprising:
    displaying on a display device of said guidance system a plurality of available functions in a menu-driven manner that is user friendly, wherein said display device is adapted for displaying text and graphics, including configuring said guidance system with said menu, said text, said menu, and said graphics adapted to be viewable under various light conditions, wherein an operator is able to vary the contrast and brightness of said text, said menu, and said graphics by using buttons to interact with a user interface of said guidance system;
    displaying on said display device a perspective view graphic to assist in guidance, first text that describes a desired path, and second text that describes deviation from said desired path; and
    providing said guidance system with a data input device adapted for accessing and interacting with any one of said available functions with a minimum number of inputs and with minimum use of said inputs, wherein said data input device enables scrolling, selecting, and editing operations, said data input device comprising a first button, a second button, and a third button that facilitate interacting with a plurality of available functions displayed on said display device, and wherein said display device, said guidance system, and said data input device are integrated in a housing, wherein said housing has a first wing-shaped portion and a second wing-shaped portion configured to protect a cable connector extending from said housing, wherein said display device is positioned on a front of said housing, wherein said first button, said second button, and said third button of said data input device are positioned on a top surface of said housing for convenient access by an operator of said integrated guidance system, wherein said top surface of said housing is substantially orthogonally adjacent to said front of said housing, and wherein said first button is larger than said second button and said third button to reduce the need for visual assistance by said operator to distinguish said first button, said second button, and said third button.

19. The method as recited in claim 18 wherein said guidance system further comprises:
    a position determination system adapted for determining a current position; and
    a lightbar device adapted for providing a visual representation of a deviation of said current position from said desired path to guide movement along said desired path.

20. The method as recited in claim 19 wherein said position determination system comprises:
    a Global Positioning System (GPS) antenna; and
    a GPS receiver.

21. The method as recited in claim 20 wherein said GPS antenna is positioned externally and separately relative to said GPS receiver.

22. The method as recited in claim 19 wherein said lightbar device comprises a plurality of lights that are adapted to emit a light pattern that indicates said deviation.

23. The method as recited in claim 22 wherein said plurality of lights are spaced apart and are aligned in a row, and wherein said light pattern is formed by selectively illuminating particular ones of said plurality of lights.

24. The method as recited in claim 22 wherein said plurality of lights comprises a plurality of light emitting diodes (LEDs).

25. The method as recited in claim 18 wherein said display device comprises a liquid crystal display (LCD).

* * * * *